(12) United States Patent
Goettker et al.

(10) Patent No.: US 8,894,132 B2
(45) Date of Patent: Nov. 25, 2014

(54) BODY MODULE COMPONENT, AND METHOD FOR THE PRODUCTION THEREOF

(75) Inventors: Stephan Goettker, Stuttgart (DE); Jan Krueger, Stuttgart (DE); Asmir Salkic, Ulm (DE); Mirko Sretenovic, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/993,771

(22) PCT Filed: Nov. 22, 2011

(86) PCT No.: PCT/EP2011/005873
§ 371 (c)(1),
(2), (4) Date: Oct. 8, 2013

(87) PCT Pub. No.: WO2012/079693
PCT Pub. Date: Jun. 21, 2012

(65) Prior Publication Data
US 2014/0021747 A1    Jan. 23, 2014

(30) Foreign Application Priority Data
Dec. 17, 2010    (DE) .......................... 10 2010 054 935

(51) Int. Cl.
| | |
|---|---|
| B60J 7/00 | (2006.01) |
| B62D 29/04 | (2006.01) |
| B62D 65/02 | (2006.01) |
| B62D 23/00 | (2006.01) |
| B62D 21/08 | (2006.01) |
| B29C 70/74 | (2006.01) |
| B29C 70/48 | (2006.01) |
| B62D 29/00 | (2006.01) |
| B29L 31/30 | (2006.01) |
| B29C 70/52 | (2006.01) |

(52) U.S. Cl.
CPC .............. *B62D 29/04* (2013.01); *B62D 29/048* (2013.01); *B62D 65/024* (2013.01); *B62D 23/005* (2013.01); *B62D 21/08* (2013.01); *B29C 70/745* (2013.01); *B29L 2031/30* (2013.01); *B29C 70/48* (2013.01); *B62D 29/043* (2013.01); *B62D 29/008* (2013.01); *B29C 70/52* (2013.01)
USPC ..................................................... 296/203.01

(58) Field of Classification Search
CPC ........... A47C 21/08; A61G 2007/0518; A61G 7/0507; B29C 66/7212; B29K 2309/08
USPC ........................................ 296/203.01, 193.04
See application file for complete search history.

(56) References Cited

U.S. PATENT DOCUMENTS

| | | | | |
|---|---|---|---|---|
| 4,752,513 | A | * | 6/1988 | Rau et al. .......................... 428/91 |
| 4,983,453 | A | * | 1/1991 | Beall .............................. 442/415 |

(Continued)

FOREIGN PATENT DOCUMENTS

| | | |
|---|---|---|
| DE | 19506160 B4 | 8/1996 |
| DE | 102008020527 A1 | 10/2009 |
| WO | 2007056840 A1 | 5/2007 |

*Primary Examiner* — Kiran B Patel
(74) *Attorney, Agent, or Firm* — Patent Central LLC; Stephen A. Pendorf

(57) ABSTRACT

A three-dimensionally shaped body module component and a method for the production thereof, which is assembled from a plurality of body module segments (1). The body module segments (1) are sections of continuously pultruded fiber plastic composite pultrudates, wherein each pultrudate has a basic structure consisting of endless fibers (20) laid in accordance with the force flux with respect to a predetermined geometry of the component. Furthermore, the basic structure has at least one passage (30) per body module segment (1) for receiving a connecting means (11), so as to connect at least two of the body module segments (1). The fibers (20) laid in accordance with the force flux are laid around the passage (30), and, furthermore, a stabilization structure (40) made from fibers is arranged around it.

9 Claims, 6 Drawing Sheets

(56) References Cited

U.S. PATENT DOCUMENTS

Figure 1:
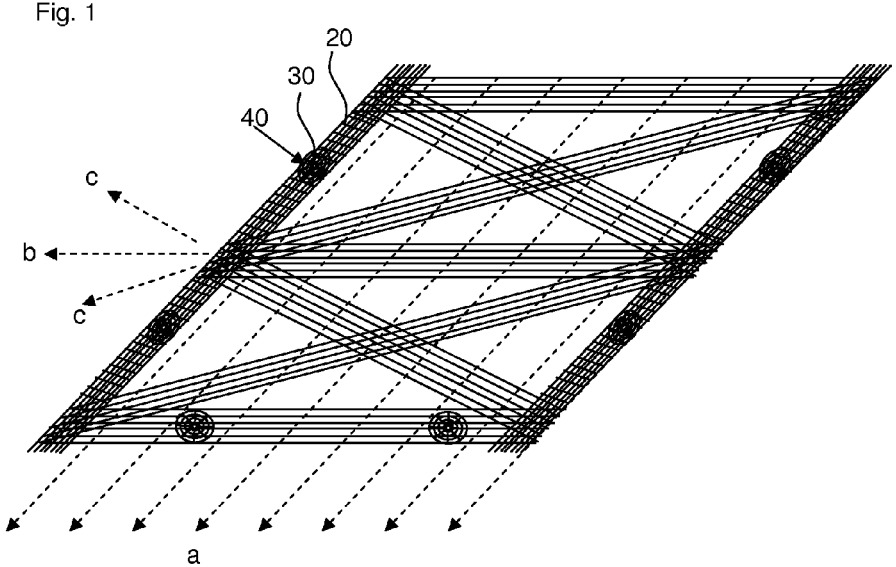

| | | | |
|---|---|---|---|
| 5,809,805 A * | 9/1998 | Palmer et al. | 66/84 A |
| 6,128,998 A * | 10/2000 | Freitas et al. | 87/8 |
| 6,139,942 A * | 10/2000 | Hartness et al. | 428/298.1 |
| 6,796,604 B2 * | 9/2004 | Igura et al. | 296/193.03 |
| 8,292,356 B2 * | 10/2012 | Ishigame et al. | 296/203.01 |
| 8,746,780 B2 * | 6/2014 | Belpaire et al. | 296/187.02 |
| 2002/0014302 A1 | 2/2002 | Fanucci et al. | |
| 2004/0118504 A1 * | 6/2004 | Herrmann et al. | 156/160 |
| 2007/0256379 A1 * | 11/2007 | Edwards | 52/309.9 |
| 2008/0078038 A1 * | 4/2008 | Borazghi | 14/73 |
| 2008/0226876 A1 * | 9/2008 | Roth | 428/172 |
| 2008/0284131 A1 | 11/2008 | Roush | |
| 2012/0319433 A1 | 12/2012 | Bufe et al. | |

* cited by examiner

BODY MODULE COMPONENT, AND METHOD FOR THE PRODUCTION THEREOF

The invention relates to a body module component and a method for the production thereof.

Extensive body structures such as floor structures made from a fibre plastic composite material are, nowadays, based on textile semi-finished products such as webs and cores, processed in many individual steps, first into a component pre-mould and then, for example using RTM technology, into a component. Such fibre composite plastic structures have a relatively low fibre content of approximately 45 vol. % and thus necessarily have low tensile moduli. Thus the fibre plastic composite material is not optimally used, and in other words a commercially optimal lightweight construction potential is still not achieved. In addition, RTM technology is not suitable for the quantity of over 5000 units and thus are only limited in mass production.

In addition, structural elements made from fibre-composite plastic such as pultrudates or profiles for the formation of a motor vehicle structural component with highly time-consuming joining techniques such as adhesion and screwing are assembled. Thus, additional component weight and costs are produced. Moreover, it is very difficult to join the fibre composite plastic structural elements in a dimensionally stable manner.

DE 10 2008 020 527 A1 describes a framework structure for the undercarriage of a self-supporting motor vehicle body with low weight. Front and rear floor elements made from fibre composite plastic material are adhered onto this framework structure, the fibre proportion of which is between 20 and 40% b.w. Furthermore, joints are provided here for the connection of individual framework elements, which can be produced from aluminium die casting.

Likewise, a framework construction made from pipe-like framework elements for motor vehicles is disclosed in DE 195 06 160 B4, which, to reduce weight, proposes extruded aluminium pipe profiles, which are joined via aluminium joints instead of a steel structure. Here, the framework construction consists of individual framework modules, wherein these can be substructures such as front or rear frames, framework passenger compartments, framework chassis and roof frameworks. A substructure—the front frame—is pre-cast with components such as coolers, ventilators, blowers, headlights or bumpers onto a front module and can then be connected precisely onto the remaining (also pre-cast) motor vehicle frame directly or via joint elements.

Based on this prior art, the object arises to produce a body module component in lightweight construction made from fibre composite plastic material in a cost-effective manner, such that a maximum lightweight construction potential is linked with minimal production costs and thus greater utilisation of materials.

This object is solved by a body module component having the features of claim 1.

The object of creating a mass-produced production of such a body module component is solved by a method having the features of claim 9.

Developments of the body module component and the method thereof are embodied in the respective sub-claims.

A first embodiment relates to a body module component that is formed three-dimensionally and is assembled from at least two body module segments. The body module segments are sections of continuously pultruded fibre plastic composite pultrudates; here, each pultrudate has a basic structure consisting of endless fibres laid in accordance with the force flux with respect to a predetermined geometry of the component. Such pultrudates are to be produced particularly advantageously with constructively geometrically simple shapes, which can be divided into sections by cutting, such that the sections can then advantageously be assembled according to the invention into the more complex body module component.

Provision is now made according to the invention for the basic structure of the component to have one or more passages, which are present in the complete body module segment as apertures or holes, in order to receive a connecting means, by means of which the body module segments can be assembled or to serve for fastening to another component, for example by means of a bolted connection.

The "constructively geometrically simple shape" of the pultrudates here relates to substantially flat or only slightly curved surface segments, which create complex three-dimensionally formed body module components by joining them together.

The fibres of the basic fibre structure, which are laid in accordance with the force flux, are therefore laid around this passage provided, and a stabilisation structure made from fibres is provided, which is arranged around the passage(s). Thus, advantageously, an endless-fibre-reinforced body module segment with holes and apertures can be provided, wherein the force flux is interrupted by the endless fibres, and not by bore-holes, which destroy the fibres.

The stabilisation structure arranged according to the invention around the passage contains, on the one hand the mechanical properties of the segment, which have been achieved by the endless fibre laid in accordance with the force flux, and on the other the hole region is additionally reinforced, which is used, for example, as a connecting point to another segment with increased force introduction. Thus, advantageously, maximum material use can be achieved, whereby the cost-effectiveness of the segments set up in this way and the versatility of their use are increased. This means that the advantageous material properties of plastics that have been reinforced advantageously by endless fibres can be completely used, since the advantage of the uninterrupted endless fibres are not compensated for afterwards by destroying the fibres; as a consequence, the segment can be optimised with minimal component costs with respect to its weight.

The body module segments set up in this way thus have fastening means with the passages, with the aid of which they can be connected indirectly or directly to one another, for example by using a connecting means that pervades the passages to form the body module component. Thus a cost-effective joining of fibre composite plastic structures beneath one another with correct force introduction and force transmission is enabled.

If the body module segments for forming the body module component are not connected directly to one another, joint elements can be used, via which the body module segments are joined. The joint element then has openings for the connecting means, which correspond to the passages of the body module segments.

In one embodiment of the body module component, the body module segments can have an internally-lying void volume, such that void sections can be present on the connecting ends of the segments. The joint element can extend into a void section and or can be brought against a wall, outer or inner wall of the connecting ends of the segments.

The joint element can consist of a metal material, and indeed, with respect to lightweight construction concepts, particularly a light metal material such as an aluminium or magnesium alloy. However, a fibre plastic composite material such as, for example, a pultruded or injected fibre plastic composite material with in particular quasi-isotropically arranged fibres, can also be used to create the joint element. Also, in the use of light metal joint structures, the fibre composite plastic segments are cost-effectively joined with correct force introduction and force transmission.

It is preferably simple for the joint element to be a cast joint element, which is in particular integrally cast positively on at least one of the walls of each of the body module segments that are to be connected.

In addition, in a region between the joint element and the wall of one of the connecting ends, an adhesive beading can be provided.

Advantageously, a high tensile modulus of the segments is achieved by a fibre content ranging from 50% to 75% with respect to the total volume of the fibre plastic composite material, preferably from 65% to 75% and ideally 70%, which is enabled by the pultrusion of the basic structure.

The body module component produced from the segments can be a motor vehicle floor, front or rear structure.

Due to the described construction, the number of tools and required production steps is significantly reduced, which also contributes towards cost reduction. The fibre composite plastic material is used better and a high level of functional integration in the body module component is possible. As well as minimal costs and maximum material lightweight construction potential, large quantities are possible.

Thus, with the method according to the invention for the production of a body module component, a simple connection of fibre composite plastic structures, directly or by means of a joint element, with as low a number of tools and production steps as possible, is enabled.

The method for the production of the three-dimensionally shaped body module component from a plurality of body module segments comprises the steps of continuous pultrusion of fibre plastic composite basic structures into pultrudates and cutting the pultrudates into the sections providing the body module segments, wherein each pultrudate has a basic structure that consists of endless fibres laid in accordance with the force flux with respect to a predetermined geometry of the component. Here, at least one passage per body module segment is created in the basic structure to receive a connecting means, so as to connect at least two of the body module segments. Since the complete component is to have one or more passages, the laying of the endless fibres for the basic structure takes place in such a way that the fibres are laid around the passage(s) provided and thus delineate a recess. The stabilisation structure made from fibres is arranged around this passage or the recess, such that a textile semi-finished product is provided fully automatically without waste directly from the fibre or, if necessary, from a roving. Then the connection of the body module segments can take place at least by a connecting means pervading the passages.

These fibre plastic composite pultrudates are produced in a continuous pultrusion process, which enables the very high fibre content of up to 70 vol. %. Thus, the method is suitable for cost-effective, mass-production-suitable, automatic production of segments produced to be load-capable and without waste for the formation of the body module component. To that end, the body module segments are connected by using connecting means that pervade the passages.

The production of the pultruded body module segment furthermore comprises the impregnation of the basic structure and the stabilisation structure arranged around the passages, having a curable plastic matrix material that is hereupon left to harden. The matrix material present in the apertures is removed and the body module segment can be finished.

As an alternative to the direct connection of the segments, these can be connected indirectly via a joint element, which enables the alignment of the segments to one another under tolerance compensation. The connection of the body module segments with the joint elements is achieved by openings for receiving the connecting means, which correspond to the passages present in the body module segments.

These joint elements can be prefabricated light metal or fibre composite plastic joint elements; in one advantageous embodiment, the body module component can be produced at the same time as the joint element, while the joint element is cast onto the body module segments, such that the joint element is produced and the body module segments are connected.

The casting of the joint elements onto the segments first comprises the positionally-exact insertion of the body module segments that are to be connected into a mould, such that the respective connecting ends of the body module segments adjoin a cavity of the mould or extend into it. The cavity has a shape for forming the joint element. After the mould has been closed, a cast material is introduced into the cavity, such that the cast material is cast integrally onto one or more walls of the connecting ends. During the solidification of the cast material, the joint element is formed, wherein a positive engagement between the walls of the connecting ends and the joint element occurs. The pultruded body module segment has at least one internally-lying void volume, which the cast material for the formation of the positive engagement can at least partially penetrate.

A light metal alloy, in particular an aluminium or magnesium alloy, can be used as the cast material, or an injection-mouldable reinforcing fibre matrix plastic mixture can be used.

These and other advantages are demonstrated by the description below with reference to the accompanying figures. The reference to the figures in the description serves to support the description and to facilitate understanding of the subject matter. Subject matters or parts of subject matters that are essentially the same or similar can have the same reference numerals added to them. The figures are only a schematic depiction of an embodiment of the invention.

Figure 2:
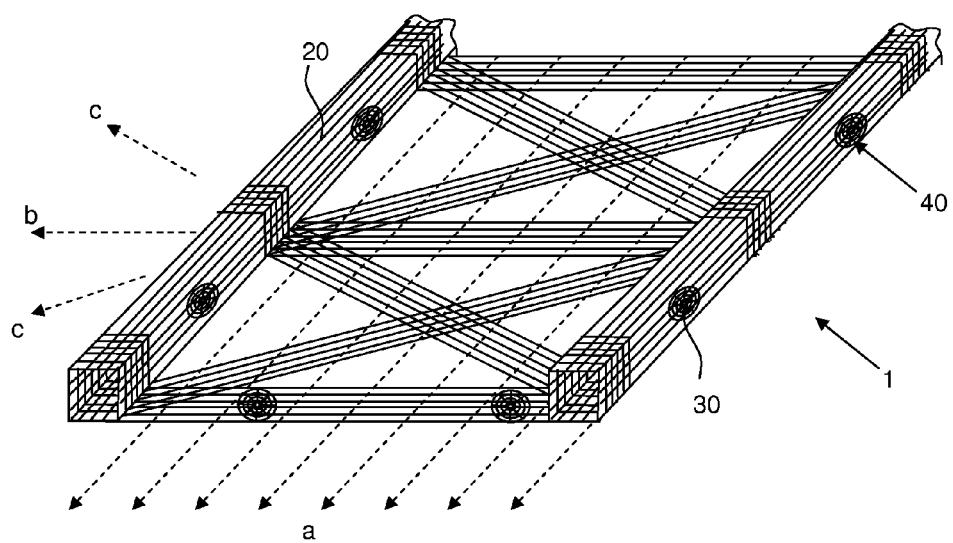
Figure 3:
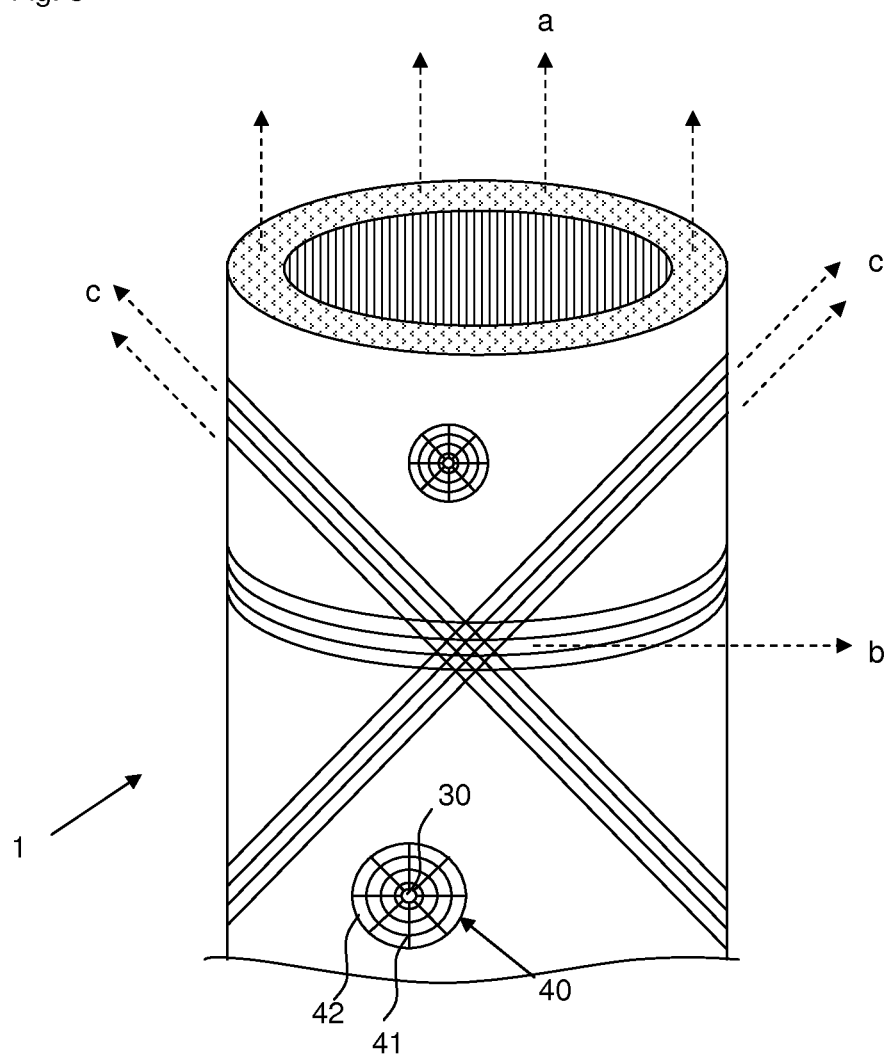
Figure 4:
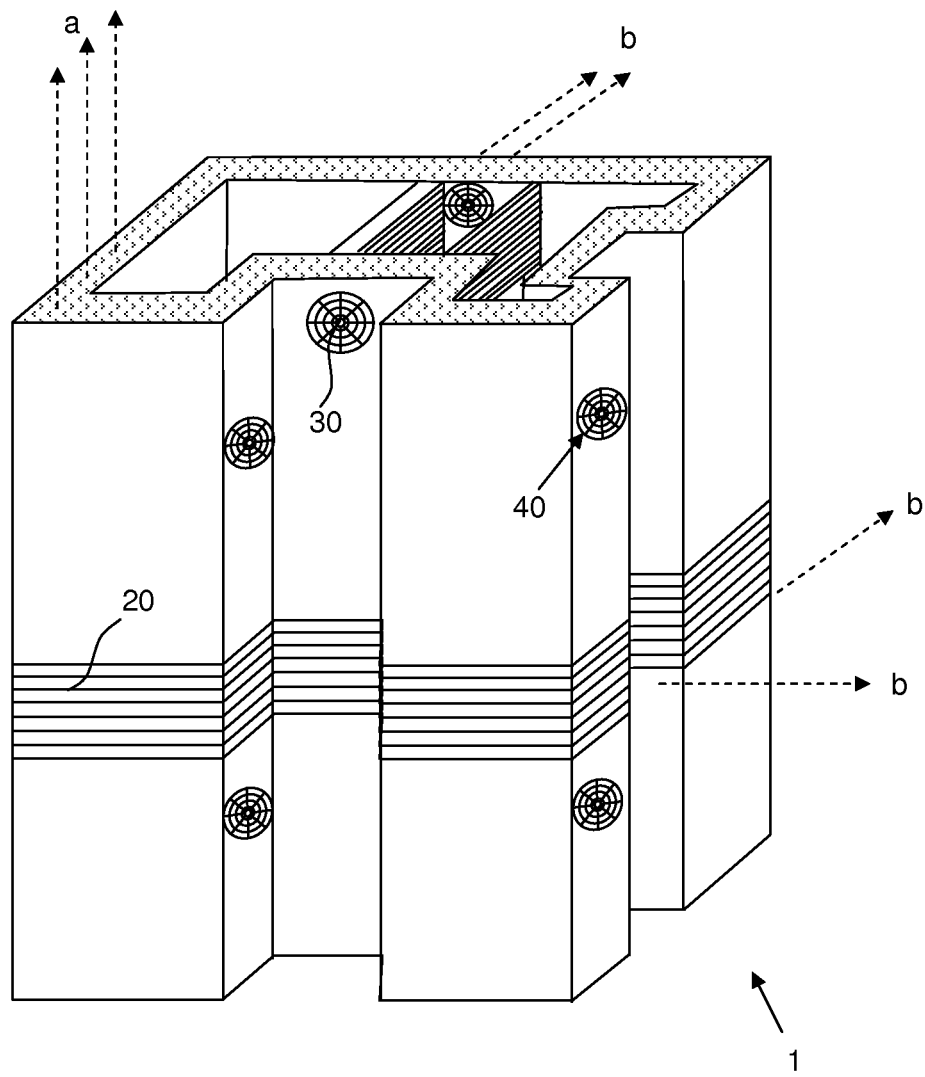
Figure 5:
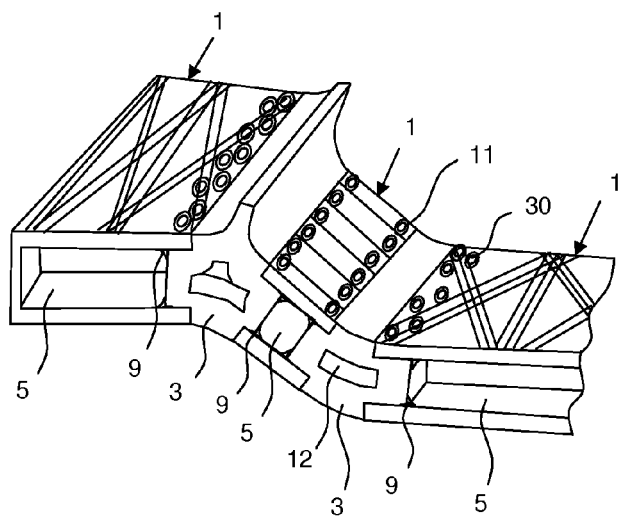
Figure 6:
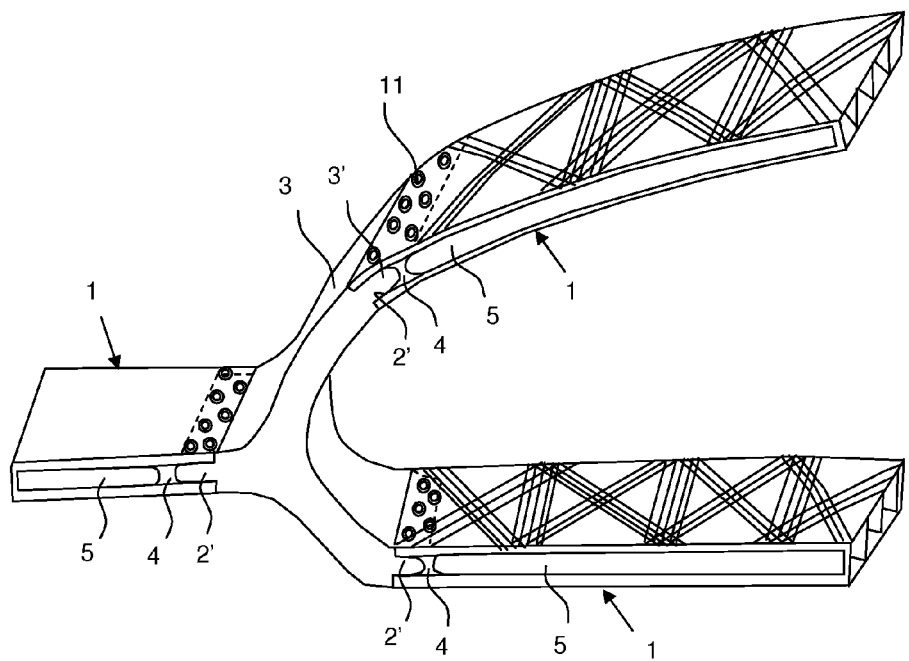
Figure 7:
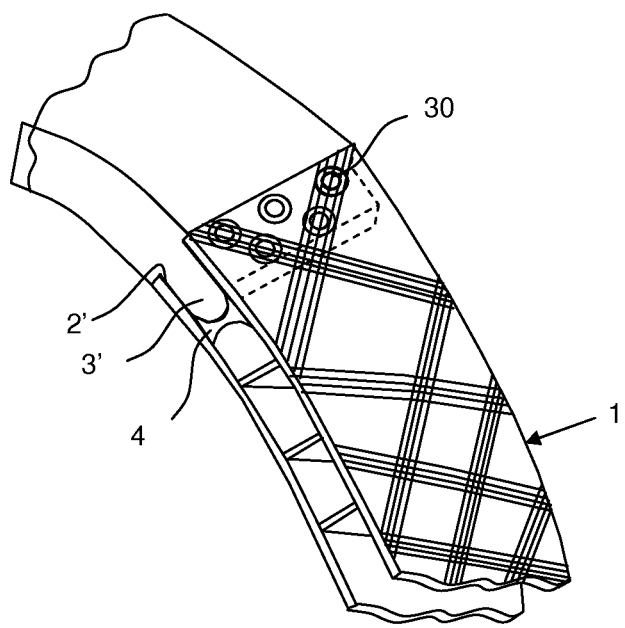
Figure 8:
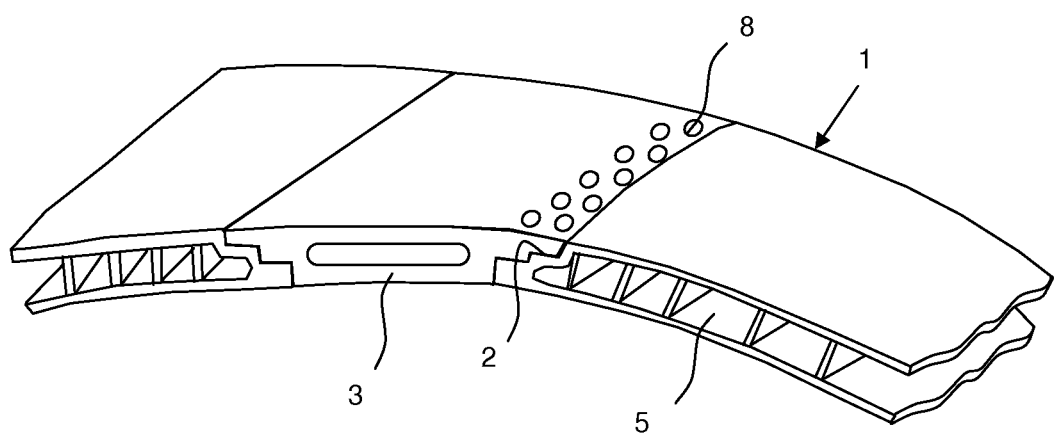
Figure 9:
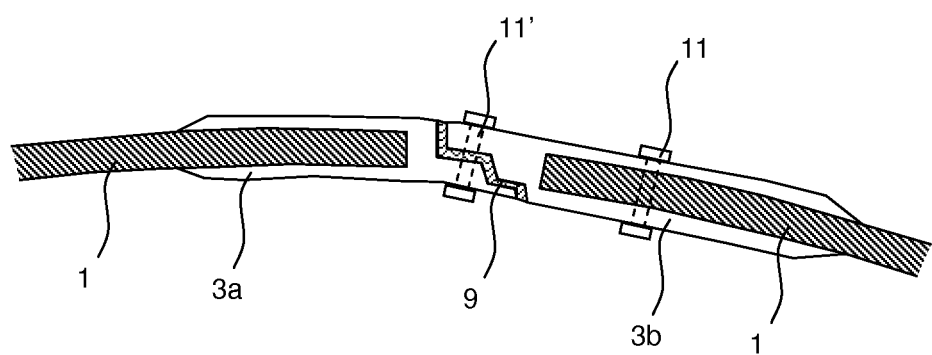

The following can be seen in the figures:

FIG. 1 a perspective top view onto a section of a laminar basic structure with stabilisation structures, FIG. 2 a perspective top view onto a fibre strand profile with stabilisation structures formed from the basic structure according to FIG. 1, FIG. 3 a perspective view of a further basic structure profile with stabilisation structures, FIG. 4 a perspective view of yet another basic structure profile with stabilisation structures, FIG. 5 a perspective view onto a body module component according to one embodiment of the invention with three body module segments that are connected via two joint elements, FIG. 6 a perspective view onto a body module component according to one embodiment of the invention, wherein three body module segments are connected by means of a joint element, FIG. 7 a perspective top view onto the joining region between a further body module segment and a joint element according to a further embodiment of the invention, FIG. 8 a perspective top view onto a further embodiment of two body module segments connected by means of a joint element, FIG. 9 a side sectional view onto a further embodiment of two body module segments connected by means of a two-part joint element.

The present invention relates a body module component that is formed three-dimensionally and is assembled from at least two body module segments 1. The body module segments 1 are a load-capable, waste-free and automatically produced plastic fibre composite preform, which first comprises a basic structure, as is shown in FIGS. 1 to 4, wherein the endless fibres 20 are laid in accordance with the force flux according to a predetermined geometry of the component.

The basic structure for forming the body module segments 1 can be a laminar structure such as in FIGS. 1 and 2, which is formed continuously from the endless fibres that are laid in accordance with the force flux, and on which stabilisation structures 40 are applied around each of the passages 30.

However, provision can also be made for the basic structure to be shaped according to a component cross-section, as is shown, for example, in FIGS. 3 and 4, and thus to have a continuous extruded profile. Such an extruded profile can also be used to form joint elements. The stabilisation structures 40 can be formed by attaching rings 42 arranged concentrically around the passage 30 (cf FIG. 4), or they can be a spiral stabilisation structure designed around the passage. In addition to this, several sections 41 can extend radially to the passage 30. The stabilisation structure can also be similar to a cobweb with radial and tangential sections.

It is thus possible to position the load-bearing fibres 20 in accordance with the force flux in the segment 1 and to implement provided apertures 30 in such a way that it leads to no interruption in the force flux of the load-bearing fibres 20. The continuous processing enables a cost-effective and mass-production-suitable production, which can be universally automatic. It enables a load-capable, waste-free and automated component production.

The fibres can be pre-existing reinforcing fibres, for example glass, carbon or aramid fibres; they can also be a fibre bundle—a so-called roving. The fibres 20 are laid continuously in accordance with the force flux for the formation of the basic structure. FIGS. 1 to 4 show sections of continuously laid extruded profiles.

According to the dotted arrow a, all components have laid longitudinal fibres, while according to the dotted arrow b, laid cross fibres and, according to the dotted arrow c, fibres displaced by +/−45° to the longitudinal and cross fibres. According to the component to be formed, the fibres 20 can also be laid in a different relationship to one another.

The depicted components are produced virtually endlessly with respect to the longitudinal direction a. Regions that are to be pierced on the later component—the passages 30—are opened fully automatically during the laying of the fibres 20, and in a further step, a stabilisation structure 40 is arranged around the passages 30.

The stabilisation structure 40 can also be formed from an endless fibre and can also be stitched around the passages 30, for example onto the basic structure. In the presently shown examples, the stabilisation structure 40 consists of several ring sections 42 arranged concentrically around the passage 30, as well as sections 41 extending radially away from the passage 30. This shape provides greater solidity to the region around the passage 30; in addition, the laying of the endless fibres of the basic structure 1 around the passage 30 ensures than the force flux is not interrupted here.

The endless basic textile semi-finished product 1 formed in this way is transferred into a pultrusion system in the shape of an extruded profile, and here is processed continuously into a final component, i.e. impregnated with a curable plastic matrix material and left to harden. After the impregnation with the matrix material and its hardening, only the resin material must still be removed from the passages 30, wherein the fibres remain undamaged. Laying the extruded profile leads to the sections that form the body module segments 1.

FIGS. 1 and 2 show a textile semi-finished product 1 in various processing levels.

Whereas in FIG. 1, the basic structure with the applied stabilisation structures 4 still represents a laminar construction, the lateral edge sections in FIG. 2 are reshaped into a square profile parallel to the longitudinal direction. Both basic structures are suitable as segments. In the laminar basic structure from FIG. 1, the passages 30 are located in the plane and are thus suitable to be screwed onto a strut-like joint element. The upturned basic structure from FIG. 2 provides an alternative connection variant with the passages 30 lying parallel to the laying plane. The formed basic structure, which here already forms a segment 1, can be a pipe-like profile, as is shown in FIG. 3; however, a complexly-shaped profile can also be implemented, as is depicted in FIG. 4. As well as forming segments 1, such basic structures are also suitable for representing joint elements.

Generally, the segments created in such a way can be laid into a tool in accordance with the force flux and can be involved in a step towards the highly integrated body module component. This body module component can preferably be a floor structure, but also a front or rear structure of the motor vehicle body. Furthermore, each body module component created can have, if necessary, further joint elements, by means of which various body module components can be joined accordingly with dimensional accuracy. It is generally conceivable for the individual segments to also be joined directly by means of a welding or adhering process; however, the reinforced passages 30 provided can advantageously be used to bolt the segments together, for example. Such a bolt connection can also be reinforced by an additional adhesive layer. However, it is preferred for the segments to be joined by means of joint elements, which allow the alignment of the segments to one another, if necessary under tolerance compensation.

FIG. 5 thus shows three pultruded fibre composite plastic body module segments 1, at least two of which are adjacent and connected by means of a joint element 3. Here, the joint elements 3 allow a user-defined, angular arrangement of the various geometrically simply shaped fibre composite plastic pultrudates 1 with respect to one another, and can therefore also in themselves be embodied differently in their set up and, for example, can have cavities 12 or bars 13 for the connection of further structures. An adhesive beading 9 is provided at the contact points between the respective segments 1 and the joints 3. Also, a bolting 11 is provided in the joint region to secure the connection here.

FIG. 6 shows a section of a module component, wherein three segments 1 are connected by means of a joint element 3. Here, there is a positive engagement between the respective fibre composite plastic pultrudate segments 1 and the joint element 3 via a section 3' extending in a cone shape from the joint element 3, which extends into a recess of the respective segment 1 that is delineated by the inner wall 2'. Here, a cast barrier 4, which can also be an adhesive, can be provided in the fibre composite plastic pultrudate 1 to delineate the void section which the joints 3 with the cone-shaped section 3' penetrates.

The fibre composite plastic pultrudate of the segments 1 can, as shown, have fibres laid at 0°, 90° and ±45°, while the radial and largely concentric fibre reinforcement structures 40 are provided around the openings 30 in which bolts 11 can be provided.

The joint element can, as described above, be cast from an aluminium or magnesium alloy; it can also be an RTM joint. In this case, the cast material is formed from an injection-mouldable reinforcing fibre matrix plastic mixture.

Like FIG. 6, FIG. 7 shows a joint element 3, which is not cast around a connecting end of the fibre composite plastic pultrudate 1, but rather extends into a recess of the fibre composite plastic pultrudate 1 that is delineated by the inner wall 2', forming a cone 3'. This recess can in turn by delineated by a cast barrier 4. In order to secure the connection between the fibre composite plastic segment 1 and the joint 3, both the segment 1 and the joint element 3 have corresponding openings 8, 30, into which connecting means such as pins or bolts can be inserted. The openings 30 on the segment 1 have radial and concentric reinforcing structures arranged around the opening 30 added to them, which prevent an interruption of the force flux in the segment 1 and reinforce the region of the openings 30.

FIG. 8 shows a further alternative joint line between the joint element 3 and the fibre composite plastic segment 1; here, the connecting wall 2 is depicted as being stepped. Also, here, openings 8 in the joint element 3 and openings that are not to be seen here are provided in the pultruded fibre composite plastic segment 1 to secure the connection. It is generally also conceivable for the contact region between joint element 3 and the wall 2 of the fibre composite plastic 1 to have an adhesive added to at along the joint line.

FIG. 9 shows a connection of two pultruded fibre composite plastic segments 1 above a two-part joint element 3, consisting of the joint sections 3a and 3b, which here have a stepped joint line corresponding to each other. The respective joint sections 3a, 3b can be connected separately to the connecting ends of the segments 1, such that, in a subsequent joining step, the segments 1 equipped with the joint sections 3a, 3b can be simply assembled. The connection of the joint sections 3a, 3b to the segments 1 is achieved by bolts 11, which are guided through the provided passages in the segment and correspondingly positioned openings in the joint sections 3a, 3b. The joint sections 3a, 3b can also be integrally cast onto the segments 1. A further bolt 11' connects the joint sections 3a, 3b to each other, on which joint line an adhesive layer 9 can furthermore additionally be provided.

In a preferred embodiment, a three-dimensionally shaped body module component is provided, which is assembled from a plurality of body module segments (1). In this case, the body module segments (1) are sections of continuously pultruded fibre plastic composite pultrudates, wherein each pultrudate has a basic structure consisting of endless fibres (20) laid in accordance with the force flux with respect to a predetermined geometry of the component. The basic structure has at least one passage (30) per body module segment (1) to receive a connecting means (11), so as to connect at least two of the body module segments (1), wherein the fibres (20) laid in accordance with the force flux are laid around the passage (30), and a stabilisation structure (40) is arranged from fibres. The body module component has at least one joint element (3), via which the at least two body module segments (1) are connected, wherein the joint element (3) has openings (8) for the connecting means (11), which correspond to the openings (30) of the body module segments (1). The fibre plastic composite pultrudate respectively represents flat or only slightly curved surface segments. It is preferred for the body module component to form a motor vehicle body or further surface components of a motor vehicle, such as doors, hatches or roofs.

The body module components of FIGS. 5 to 9 are created from the load-capable, waste-free, three-dimensionally shaped basic structures 1 after further processing in the pultrusion process, whereby fibre contents of up to 70 vol. % are correspondingly high tensile moduli of the segments are possible. The complex lightweight construction body modules are thus preferably created from the load-capable fibre composite plastic pultrudate segments and the connected joint elements made from metal or a fibre composite plastic.

The body module component according to the invention consists of several—at least two—body module segments and preferably at least one cast joint element. The semi-finished product segments used are a fibre plastic composite pultrudate, which corresponds in particular to the desired lightweight construction of a motor vehicle due to an internally lying void volume and due to the arrangement of the reinforcing fibres in accordance with the force flux.

The pultruded fibre composite plastic segments provided can, according to the invention, in one embodiment, be joined cost-effectively by direct casting of the fibre composite plastic segments in the joints with exact positioning to one another by compensating for component warping. The casting process guarantees the correct force introduction and force transmission. Due to the very high fibre content of the pultrusion profiles, load-capable structures can be implemented by means of this simplified joining technology with maximum material usage and with consistent lightweight construction.

Thus, a body module component can consist of two or more segments, which are connected by means of a cast joint element. The segments consist of the fibre plastic composite pultrudate and have at least one internally-lying void volume. The joint element is integrally cast positively into at least one wall of a connecting end of each of the segments to be connected, while the segments outside of the joint element are free from cast material. The fundamental proportion of the motor vehicle structural component is thus formed by the fibre composite plastic components, which are joined simply via a joint cast integrally at their connecting ends.

Insofar as the joint element (3) is a cast joint element (3), the connecting means (11) can preferably be assembled with the joint element (3) or cast as one piece. The joint element and connecting pin are thus cast in the same process step as the single-piece component. It is therefore possible, for example, to connect several body module segments (1) at the same time via the integral casting of a joint element, in particular one made from an aluminium or magnesium alloy, while the passages (30) with the material of the joint element are effused. The method step for receiving the connecting means (11) is thus integrated into the integral casting of the joint element.

In this way, the advantages of the very high fibre content and the load-capable structures of the fibre composite plastic components can be used by connection via a cost-effective cast joint with compensation for component tolerances and maintenance of the correct force introduction and force transmission during the production of motor vehicle structural components, and they enable optimisation of costs and light-weight construction.

The integrally cast joint element can here penetrate a void section present at the connecting ends of the segments; alternatively or additionally, the joint element can encapsulate an external wall of the connecting ends of the semi-finished product components, or can come into contact with them there.

Provision is furthermore made for the joint element and the segments to have openings for connecting pins. The joint element has the opening in the region in which it comes into contact with the connecting ends of the segments; accordingly, the openings of the segments are also present at the connecting ends and are congruent to the openings of the joint element. However, further openings can also be provided on segments and/or joints for other purposes.

In addition, an adhesive beading can be present in a region in which the joint element adjoins the wall of a connecting end.

If the joint element is formed from a cast material, first the segments to be connected are inserted into a mould with positional exactitude. The respective connecting end of the segments to be connected is inserted with respect to a cavity of the mould in such a way that the connecting end at least adjoins the cavity. The cavity serves to form the shape of the joint element.

The closing of the mould and the insertion of the cast material into the cavity follow this, wherein one or more walls of the connecting end of the corresponding segments are integrally cast with the cast material. By leaving the cast material to solidify for the formation of the joint element, a positive engagement is formed between the wall of the respective connecting ends and the joint element. The connection method according to the invention of the direct integral casting of a joint structure onto the fibre composite plastic structures significantly reduces the number of required tools and the number of production steps during the production of complex motor vehicle structural components. In addition, a force applied to the component can be introduced better into the structure and can be transferred further, and thus the material can be used better.

As an alternative to integral casting, the connecting ends of the segments can extend into the cavity of the mould, such that the formed joint element encapsulates the connecting ends of the segments to be connected. The cast material can be a light metal alloy such as an aluminium or magnesium alloy; however, an injection-mouldable reinforcing fibre matrix plastic mixture is also conceivable.

In a method variant in which the internally lying void volume of the segment is open at the connecting end, such that the segment is arranged in or on the cavity, and that the void volume flows into the cavity and thus provides a flow path for the cast material, a cast barrier is introduced into the void volume before the step of the positionally exact insertion of the segment, which is arranged close to the connecting end and thus prevents a further penetration of the cast material into the void volume. The cast joint element thus remains limited to the region of the connecting ends. Here, a massive section can be formed.

Furthermore, provision is made for a pre-mould having fibres to be arranged in the cavity before the cast material is inserted into the cavity. The fibres can be metal fibres, carbon fibres, glass fibres and/or textile, in particular aramid fibres. Here, at least one of the walls of the connecting ends of the segments to be connected comes into contact with the pre-mould, which, in the subsequent step, is pervaded and/or recast by the cast material during the insertion of the cast material. This pre-mould can be a mould core, in particular a fibre pre-mould surrounding a sand core. The joint element is reinforced by the pre-mould that has reinforcing fibres.

Also, without the use of a pre-form with fibres, it is conceivable for a mould core, such as a sand core, to be introduced into the cavity before the cast material is inserted into the cavity, so as equip the joint element that is to be formed here with an internally lying void in order to once again allow for light weight construction concepts.

Finally, provision can be made for banks to be provided on an inner wall at the connecting ends of the segment, while the cavity of the mould is designed in such a way that spacers are formed, which have a shape to be received between two banks, wherein adhesive beadings are introduced between the banks in which no spacers are received.

It is furthermore also conceivable for the joint element to comprise a fibre reinforcement, which likewise, quasi-isotropically, has a fibre composite plastic pultrudate with fibre directions at 0°, 90°, ±45°, ±60° etc. Here, hole reinforcements can of course be provided radially and in concentric circles around the openings. This pre-mould is, together with the pultruded segments, inserted into the cavity of the mould and cast by a cast material in the manner described.

Integrally cast inserts can be used to form the openings in the cast joint element. Here, these can be, for example, sleeves or inner threads, which are formed from metal, for example. It is thus ensures that the joints that form a positive engagement with the semi-finished products can additionally be fastened to the segment, such that the formed body module segment has the desired stability in the joint region.

It is generally not out of the question for the joint elements provided to connect the segments to first be joined to a framework structure of the body module component, and, in the next step, for the segments to be bolted or riveted to the frame by means of the passages present there. The joint elements for the formation of such a framework structure can be cast from a light metal alloy, for example; however, the joint elements can also be pultruded fibre composite plastic structures, as shown in FIGS. 3 and 4, and can also form a pipe-like or polygonal profile, which is cut in a suitable manner and joined to the framework structure. Accordingly, pultruded joint elements with fibre-reinforced passages can also be equipped with the pultruded segments.

Thus, the object according to the invention provides a cost-effectively joined body module component from fibre composite plastic structures, which conforms to lightweight construction concepts and still enables correct force introduction and force transmission.

The invention claimed is:

1. A three-dimensional shaped body module component, which is assembled from a plurality of body module segments (1), wherein the body module segments (1) are sections of continuously pultruded fibre plastic composite pultrudates, wherein each pultrudate has a basic structure that consists of endless fibres (20) laid in accordance with the force flux with respect to a predetermined geometry of the component, and wherein the basic structure has at least one passage (30) per body module segment (1) for receiving a connecting means (11), in order to connect at least two of the body module segments (1), wherein
   the fibres (20) laid in accordance with the force flux are laid around the passage (30), and
   a stabilisation structure (40) made from fibres is arranged around the passage (30).

2. A body module component according to claim 1, wherein the body module component has at least one joint element (3), via which the at least two body module segments (1) are connected, wherein the joint element (3) has openings (8) for the connecting means (11), which correspond to the openings (30) of the body module segments (1).

3. The body module component according to claim 2, wherein the body module segment (1) has at least one internally lying void volume (5), wherein void sections are present at connecting ends of the body module segments (1), and wherein the joint element (3) comes into contact with the connecting ends of the segments (1) in the void sections and/or on a wall (2, 2').

4. The body module component according to claim 2, wherein the joint element (3) consists of a metal material, in particular a light metal material or a fibre plastic composite material, in particular a pultruded fibre plastic composite material.

5. The body module component according to claim 4, wherein the joint element (3) is a cast joint element (3), which is integrally cast positively onto at least one of the walls (2, 2') of each of the body module segments (1) that are to be connected, and/or the joint element (3) is a cast joint element (3) and the connecting means (11) are cast together with the joint element (3) as one piece.

6. The body module component according to claim 2, wherein at least one adhesive beading (9) is provided in a region between the joint element (3) and the wall (2, 2') of one of the connecting ends.

7. The body module component according to claim 1, wherein the body module component (1) has a fibre content ranging from 50% to 75% with respect to the total volume of the fibre plastic composite material.

8. The body module component according to claim 1, wherein the body module component is a motor vehicle floor, front or rear structure.

9. The body module component according to claim 1, wherein the body module component (1) has a fibre content ranging from 65% to 75% with respect to the total volume of the fibre plastic composite material.

\* \* \* \* \*